(12) United States Patent
Krstanovic et al.

(10) Patent No.: US 8,279,107 B2
(45) Date of Patent: Oct. 2, 2012

(54) RADAR VEHICLE DETECTION SYSTEM

(75) Inventors: Chris Krstanovic, Windham, NH (US); Scott Keller, Still River, MA (US); Eric Groft, Somerville, MA (US)

(73) Assignee: Innovapark LLC NY (US)

( * ) Notice: Subject to any disclaimer, the term of this patent is extended or adjusted under 35 U.S.C. 154(b) by 0 days.

(21) Appl. No.: 12/805,467

(22) Filed: Aug. 2, 2010

(65) Prior Publication Data

US 2011/0063156 A1    Mar. 17, 2011

(51) Int. Cl.
*G01S 13/00* (2006.01)
(52) U.S. Cl. .................................. 342/27; 342/118
(58) Field of Classification Search ........... 342/118–146
See application file for complete search history.

(56) References Cited

U.S. PATENT DOCUMENTS

| | | | |
|---|---|---|---|
| 2007/0210935 A1* | 9/2007 | Yost et al. | 340/932.2 |
| 2008/0235082 A1* | 9/2008 | Zanotti et al. | 705/13 |
| 2009/0201123 A1* | 8/2009 | Kafry et al. | 340/3.32 |
| 2010/0152972 A1* | 6/2010 | Attard et al. | 701/42 |

* cited by examiner

*Primary Examiner* — Timothy A Brainard
(74) *Attorney, Agent, or Firm* — R. J. Lasker, Esq.

(57) ABSTRACT

A radar parking detection system with a Ultra Wide Band (UWB) detection and transmission system including a hardened radar device placed in the vicinity of a parking space to be monitored by using measurements of time delays observed in the reflection of radio waves reflected from objects in the proximity of the transmitted waves and further including a hardened electronic sensor using (UWB) frequencies to determine the presence or absence of a vehicle in the parking space at close range; and a radio transmitter using multiple data transmission to limit the amount of lost data and to communicate changes in status of the parking space.

4 Claims, 1 Drawing Sheet

RADAR VEHICLE DETECTION SYSTEM

BACKGROUND OF THE INVENTION

1. Field of the Invention

The Radar Parking Detection System of the present invention employs a specific form of radar technology to Remote Asset Management (RAM) parking systems such as that disclosed in U.S. patent Ser. No. 11/802,244, filed 21 May 2007.

2. Related Art

The provisional patent application Ser. No. 61/202,201, filed 5 Feb. 2009, which relates to multiple task specific processors such as an Application Processor, a Meter Controller and a Radio Processor, all controlled via shared SPI bus and using rechargeable batteries and solar power sources for controlling and monitoring a vehicle parking meter system.

The invention entitled: Parking System Employing RAM Techniques, Ser. No. 11/802,244, filed 21 May 2007, which relates to the management of vehicle parking systems and, in particular, to such systems using remote management techniques for enhancing management efficiency and to provide solutions to the parking system that could not otherwise be managed by: (1) sensing, collecting, recording and displaying data regarding all aspects of the environment pertaining to the parking system; (2) analyzing the data collected to create actionable outputs responsive to the needs of the public and the management of the parking system; (3) communicating with the various parking system components; and (4) receiving feedback to perform requested operations for the parking system.

The problem solved by the Radar Parking Detection System of the present invention is that while inductance loop vehicle detection remains the most reliable form of vehicle detection for monitoring the stationary vehicles in a parking space, installation of inductance loops may be impractical in certain situations. The use of other sensors has often been impractical by interference for movement and events outside of the intended monitored space of the parking space being monitored.

SUMMARY OF THE INVENTION

The Radar Parking Detection System of the present invention's preferred embodiment is that of a hardened electronics device placed in the roadbed of the space to be monitored. The electronics contain a sensor using Ultra Wide-Band frequencies to determine the presence or absence of a vehicle in the space. Other radar technologies can also be used for the determination of presence or absence of a vehicle. The electronics also contain a radio transmitter to communicate changes in status of either the space or the monitoring sensor's operability to a radio collector such as one described in the RAM Patent.

DETAILED DESCRIPTION

Figure 1:
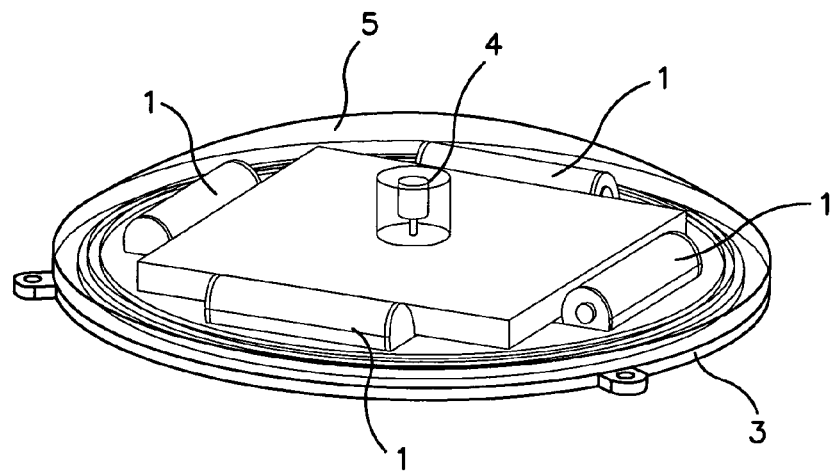
FIG. 1 illustrates a conceptual form of the invention.

1. Use of Radar Technologies in a RAM Parking System

The use of induction loops for vehicle detection—while accurate, reliable and able to detect non-moving vehicles for extended periods of time—can be expensive or impractical to install. Other methods of detection are easily disrupted by disruption of line—of—sight blockages, nearby magnetic field changes or an inability to track changes in the sensing environment.

Radar systems employ electrical circuits that are able to detect the presence or absence of objects by using measurements of time delays observed in the reflection of radio waves as they are reflected from objects in the proximity of the transmission of said waves. Radar devices can be placed either in the roadbed of the parking space or otherwise the bordering curb or parking bumper in the front of, or to the side of the parking space. This placement avoids issues with detection being disrupted by malicious or inadvertent interference by objects passing between the detection unit and the space being monitored.

2. Use of Ultra Wide Band Radar Technologies in a RAM Parking System

Many radar technologies are not able to detect objects in close proximity while maintaining efficient power consumption levels needed for practical application in parking systems.

UWB radar systems employ electrical circuits that are able to detect the presence or absence of objects at close range with a highly efficient power consumption rate. This attribute allows them to effectively be used in the stead of induction loop technologies with a negligible reduction in accuracy and reliability.

3. Use of a Multiple Attempt—No Acknowledgement Communications Scheme

Radio transmissions require a relatively larger amount of power simply to energize the transmitting antenna and circuitry. This consumption is furthered when receiving transmissions to establish an acknowledgement sequence to the upstream radio device. Without some sort of acknowledgement and re-try logic, individual messages are likely to be lost in transmission causing incomplete data and inaccurate information to be processed by the RAM system's centralized Command and Control Interface. Much of the data loss is also attributed to many devices attempting to communicate at the same time.

The UWB Parking Detection System uses multiple transmissions to guard against lost data. By transmitting the data many times by default, the amount of lost data is minimized. To protect against two devices attempting to communicate at the exact same time each time a transmission is attempted, the system uses random pause lengths between each transmission attempt. This allows the two devices competing to transmit their message to the collector interfere with each other only once. The next time each device attempts to send the message, the random pause length will cause one device to wait longer than the other before making its second attempt.

4. Use of a Hardened Housing Encasement Made of Glass-Filled Nylon or Other Similar Material Devices deployed for the purpose of parking space monitoring are often subject to harsh use. The placement of UWB devices in the roadbed of the space only amplifies the hostile environment in which the electronics must operate. In particular, the devices are subject to vehicles driving over them and angry parking patrons subjecting them to vandalism attempts.

The UWB system is packaged in a low-profile shell made of glass-filled nylon or some other similar substance. This substance is highly durable and cost-effective to produce. The shell is mounted to the surface of the space using high-tensile strength adhesives and mounting screws to ensure it is very difficult to damage. For installations in curbs or parking bumpers, the same materials can be used to form a casing which can be installed into portions cut out from the curb or bumper using similar adhesives.

System Overview

FIG. 1 conceptually illustrates the batteries arranged around the outside of the electronics package 3 and wherein the sensing subsystem, transmitting subsystem, the power subsystem and the mechanical subsystem are mounted. An antenna 4 is mounted to the electronics board for transmission of data and a protective housing 5 encloses the components as described above.

Figure 2:
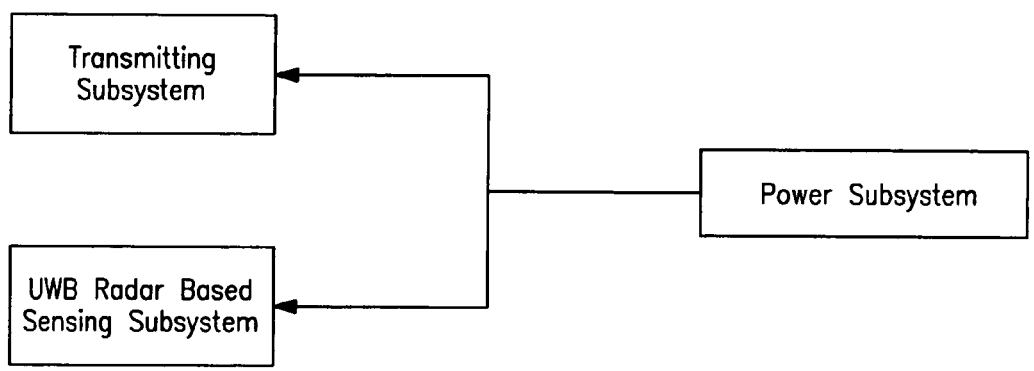
FIG. 2 is a block diagram representation of the invention.

FIG. 2 shows the essential components of the Radar Detection System of the present invention, wherein the UWB Radar-Based Sensing Subsystem, as described above, and the Transmitting Subsystem are energized by the Power Subsystem.

The invention claimed is:

1. A Radar Parking Detection System, comprising:
   an Ultra Wide Band detection and transmission system including a hardened radar device placed in the vicinity of a parking space to be monitored by using measurements of time delays observed in radio waves reflected from objects in the proximity of the transmitted waves;
   said radar detection system including a hardened electronic sensor using Ultra Wide Band frequencies to determine the presence or absence of a vehicle in the parking space at close range;
   a radio transmitter using multiple data transmission to limit the amount of lost data and to communicate changes in status of the parking space and the Ultra Wide Band detection and transmission system in which the multiple transmissions use random pause lengths between each transmission attempt; and
   said radio transmitter also transmits the operability of said detection and transmission system.

2. A Radar Parking Detection System as in claim 1, wherein the [UWB] Ultra Wide Band detection and transmission system is packaged in a low-profile shell made of glass-filled nylon or some other similar substance and mounted to the surface of the parking space using a high-tensile strength adhesive and mounting screws to ensure the integrity of the low-profile shell.

3. A Radar Parking Detection System as in claim 2, further comprising an antenna, mechanical subsystem and power subsystem and wherein the sensing subsystem, transmitting system, power subsystem, the antenna and mechanical subsystem are enclosed in said low-profile shell.

4. A Radar Parking Detection System as in claim 1, wherein said detection and transmission system is placed in at least one of the roadbed of the parking space, the bordering curb or parking bumper in the front and to the side of the parking space.

* * * * *